United States Patent
Marotzke

(10) Patent No.: US 7,055,857 B2
(45) Date of Patent: Jun. 6, 2006

(54) AIRBAG ARRANGEMENT

(75) Inventor: Thomas Marotzke, Hohen-Neuendort (DE)

(73) Assignee: Takata-Petri AG, Aschaffenburg (DE)

( * ) Notice: Subject to any disclaimer, the term of this patent is extended or adjusted under 35 U.S.C. 154(b) by 99 days.

(21) Appl. No.: 10/777,226

(22) Filed: Feb. 13, 2004

(65) Prior Publication Data

US 2004/0232675 A1 Nov. 25, 2004

Related U.S. Application Data

(63) Continuation of application No. PCT/DE02/02987, filed on Aug. 13, 2002.

(30) Foreign Application Priority Data

Aug. 14, 2001 (DE) ................ 101 39 626

(51) Int. Cl.
*B60R 21/28* (2006.01)
*B60R 21/26* (2006.01)

(52) U.S. Cl. ............. 280/736; 280/742; 280/739
(58) Field of Classification Search .............. 280/736, 280/739, 738, 742; B60R 21/28, 21/30
See application file for complete search history.

(56) References Cited

U.S. PATENT DOCUMENTS

| | | | |
|---|---|---|---|
| 5,695,214 A * | 12/1997 | Faigle et al. | 280/735 |
| 5,707,078 A | 1/1998 | Swanberg et al. | |
| 5,947,514 A | 9/1999 | Keller et al. | |
| 6,082,765 A | 7/2000 | Bowers et al. | |
| 6,206,408 B1 * | 3/2001 | Schneider | 280/728.1 |
| 6,241,279 B1 | 6/2001 | Ochiai | |
| 6,322,102 B1 | 11/2001 | Rau et al. | |
| 6,497,431 B1 * | 12/2002 | Schramm | 280/736 |
| 6,588,795 B1 * | 7/2003 | Fischer et al. | 280/736 |
| 2001/0038201 A1 | 11/2001 | Ryan | |
| 2003/0155756 A1 * | 8/2003 | Hawthorn et al. | 280/739 |

FOREIGN PATENT DOCUMENTS

| | | |
|---|---|---|
| DE | 100 01 086 A1 | 5/1997 |
| DE | 197 03 172 A1 | 8/1998 |
| DE | 198 10 537 A1 | 9/1999 |
| DE | 198 21 838 A1 | 11/1999 |
| DE | 200 21 533 U1 | 5/2001 |
| EP | 0536 677 A1 * | 4/1993 |
| EP | 0 599 378 A1 | 6/1994 |
| EP | 0 800 967 A2 | 10/1997 |
| EP | 1 112 902 A2 | 7/2001 |
| GB | 2 315 467 A * | 2/1996 |
| GB | 2 306 409 A | 5/1997 |
| GB | 2 338 214 A | 12/1999 |
| WO | WO 98/26960 A1 | 6/1998 |
| WO | WO 98/31570 A1 | 7/1998 |
| WO | WO 99/64273 A1 | 12/1999 |
| WO | WO 00/30901 A1 | 2/2000 |

* cited by examiner

*Primary Examiner*—Ruth Ilan
(74) *Attorney, Agent, or Firm*—Foley & Lardner LLP

(57) ABSTRACT

An airbag arrangement including an airbag, a gas generator and a housing. The housing includes an outlet for letting gas out of the airbag arrangement and a passage for allowing gas from the gas generator into the housing. A closing device is provided. The closing device can be adjusted between an open position, in which the outlet is open and the passage is at least partially closed, and a closed position, in which the outlet opening is closed and the passage opening is open. A releasable lock is provided for locking the closing device in the open position.

17 Claims, 14 Drawing Sheets

AIRBAG ARRANGEMENT

CROSS-REFERENCE TO RELATED APPLICATIONS

This is a continuation of International Application PCT/DE02/02987, which has an international filing date of Aug. 13, 2002; this International Application was not published in English, but was published in German as WO 03/016106.

BACKGROUND

The invention relates to an airbag arrangement.

To protect occupants of a vehicle, airbags are known which are deployed and inflated in the event of an accident in order thereby to lessen the impact of an occupant.

In the case of conventional airbags, the airbag deploys explosively in an accident in order to be able to open the predetermined breaking points and protect the occupants in good time. For occupants who are wearing their seatbelts and maintain the correct distance from the airbag, said airbag then provides effective protection. However, this is not the case for occupants who are sitting "out of position" (referred to below as OOP) and, when the airbag is released, are, for example, too near or are positioned unfavorably in another manner. The consequence may be severe injuries even including fractured skulls or broken necks. Infants in rearward child seats which are fitted counter to the direction of travel are particularly at risk. The National Highway Traffic Safety Administration has calculated that, in the USA, for every 1000 people whose lives have been saved by an airbag, there are 57 people who, without the supposed protection, would still be alive.

SUMMARY OF THE INVENTION

As described above, there is the risk under OOP conditions (for example, no distance between the airbag module and vehicle occupant) that the energy of the gas generator which inflates the airbag may seriously injure the occupant. Therefore it is expedient to keep the gas of the gas generator away from the occupant in an OOP situation. There are various approaches to solving this. A first approach is to control an outlet opening so that the latter opens in an OOP situation, and is closed in an "in position" situation. The outlet opening may be an outlet opening with a controllable cross section, or else may be a plurality of separate outlet openings, at least one of which is provided for the "in position" situation, and the others only become effective (open) in the OOP situation.

In particular, there are the "opening" and "closing" approaches. In the "opening" approach, the outlet opening is closed and is opened in the event of an OOP situation. For this purpose, a sensory mechanism is provided in the vehicle which, when an OOP situation is recognized, brings about an opening of the outlet opening as rapidly as possible. This approach has the advantage that no gas losses occur during the inflation process in the "in position" situation. On the other hand, this approach has the disadvantage that the opening of the outlet opening takes up time. It is better in this regard if the outlet opening is open from the outset.

In the "closing" approach, the outlet opening is always open. The airbag module is therefore continuously set to an OOP situation. If an "in position" situation exists, then the time which passes between the airbag being released and the vehicle occupant plunging into the airbag is available for closing the outlet opening and for completely inflating the airbag. Measurements have revealed that this corresponds to approximately 40 ms on the driver's side. It has been determined that this period of time is generally sufficient and the "closing" approach has an advantage over the "opening" approach.

In particular, the outlet opening is immediately effective independently of a sensory mechanism. In addition, depending on the design of the airbag arrangement, initial gas losses can be compensated for by the "Venturi effect" (the intake of additional air).

A further approach is based on the delay in the maximum expansion of the airbag in the presence of an obstacle (vehicle occupant). This can be realized, for example, using rebound straps. The stretching of provided rebound straps in the presence of the obstacle takes place at a very late point and is used as a signal for controlling the outlet opening.

In particular, the control of the outlet opening can advantageously be realized by a control slide. A control slide of this type can be configured so that it is acted upon by the gas produced by the gas generator, when the gas generator is ignited, thereby divides the gas flow and conducts part of the gas flow below the instrument panel (IP) and another part into the airbag. The driving force for the movement of the control slide is consequently made available by the gas generator.

There are a number of scenarios when a control slide is used. In a first scenario, the control slide is, in the starting position, open toward the instrument panel and closed toward the airbag. The control slide is locked and can be released by a separately activatable mechanism. After release, the control slide moves into its end position, releases the gas flow into the airbag and closes the outlet opening in the direction of the instrument panel.

In a second scenario, outlet openings to the airbag or under the instrument panel are partially open in the starting position of the control slide. In the starting position, the gas flow is controlled in both directions. If the control slide is not released, then some of the air flow under the instrument panel is lost. The inflation power of the gas generator is therefore reduced ("low onset"). The slide movement is released in a controlled manner via a separately activatable mechanism. This mechanism may be activated, for example, using a rebound strap stretching, or via deformation elements which support the control slide and "gradually" deform or are deformed. Different end and starting positions make it possible for the generator power which is guided into the airbag to be graduated.

In a third scenario, only the first stage of a gas generator is ignited in an OOP situation. The control slide is then released. When the second stage is ignited, the outlet opening to the airbag is closed, and an outlet opening is opened in the direction of the instrument panel. The gas of the second stage is therefore virtually completely kept away from the occupant and blown under the instrument panel (waste ignition).

In a fourth scenario, the positive pressure prevailing in the pressure space of the airbag arrangement is used in order, for example, to inflate a knee airbag via a separate gas duct, the overflow opening being closed after the second airbag is filled.

Furthermore, instead of an opening control slide, use may also be made of a fabric hose, a flap or a closing slide in combination with rebound straps. For example, outflow openings may be provided in a preferably cylindrical part of the module housing. In the starting position, a folded fabric hose in the form of a Chinese lantern is fastened to the bottom of the cylindrical section. The folded state is maintained by rip seams, bonding or the like. The fabric hose is connected to the airbag by rebound straps. The fabric hose is stretched as a function of the expansion of the airbag and is pulled in front of the outlet openings which are thereby closed.

As an alternative, the one or more outlet openings may also be closed by a slide or a flap.

According to an exemplary embodiment of the present invention, an airbag arrangement is provided. The airbag arrangement includes an airbag; a gas generator for producing gas to inflate the airbag; a housing for accommodating the airbag and/or at least part of the gas generator; at least one outlet opening in the housing for letting gas out of the airbag arrangement; and a closing device which can be adjusted between an open position, in which the outlet opening is essentially open, and a closed position, in which the outlet opening is essentially closed, the closing device being in the open position in the inoperative state of the airbag arrangement.

The airbag arrangement according to one exemplary embodiment of the present invention has the advantage that, in the inoperative state, i.e. before the airbag is activated by a corresponding sensor signal in an accident, an outlet opening is exposed through which, when the airbag system is activated (i.e. in an accident), in principle gas produced by the gas generator can flow. If there is an "out of position" situation (called OOP situation below), then the outlet opening remains open (i.e. the closing device remains in the open position), and (complete) inflation of the airbag is prevented. As a result, the OOP occupant is protected from injuries caused by an explosive deployment of the airbag.

Conversely, the closing device transfers into the closed position when the airbag arrangement is activated in the absence of an OOP situation. In the closed position, the outlet opening is closed and the gas produced by the gas generator flows entirely into the airbag and inflates the latter correctly.

More time is available for a transfer from a state in which the airbag is not inflated or is inflated only in a retarded manner (open position of the closing device) into a state in which the airbag is correctly inflated (closed position of the closing device) than vice versa. In other words, there is more time to allow the closing device to transfer from the open position into the closed position than vice versa. The reason for this resides in the fact that the greatest risk of injury for the vehicle occupant in an OOP situation is at the beginning of the deployment of the airbag, i.e. during the initial, explosive expansion of the airbag.

Conversely, there is comparatively more time to sufficiently inflate the airbag in the "in position" situation (i.e. in the absence of an OOP situation), in order to ensure optimum protection of the occupant. Thus, the closing device is preferably in the open position in the inoperative state of the airbag arrangement, and not in the closed position.

The airbag arrangement may include a releasable lock which releasably locks the closing device in the open position in the inoperative state. In this case, the releasable lock is coupled to a release device which brings about a release of the lock when the airbag arrangement is activated in the absence of an OOP situation. As already indicated above, activation of the airbag arrangement is a response to the accident situation in which the airbag is ideally (i.e. in the "in position" situation) to be completely deployed in order to protect the occupant.

The release device can, for example, be configured to receive a release signal from a sensor which is configured for detecting an OOP situation, which sensor produces said signal when the airbag arrangement is activated in the absence of an OOP situation. Sensors for detecting an OOP situation are generally known. The output signal of a sensor of this type may be processed by the release device together with an airbag activation signal so that, in the "in position" situation, the airbag is completely deployed. To this end, the closing device is released, so that it can transfer from the open position into the closed position, and therefore opposes a further outlet of gas produced by the gas generator via the outlet opening.

In one refinement, the release device is formed by a tension strap which, when the airbag is correctly deployed, exerts a tensile force on the releasable lock, which brings about a release of the lock. Correct deployment of the airbag refers to the situation in which free deployment is not obstructed by an OOP occupant. In such a situation, a tension strap fastened, for example, to the inside of the airbag, on the one hand, and to the lock, on the other hand, can be tightened and can therefore apply the mentioned tensile force. In the reverse situation, if, for example, an occupant is positioned too closely to the deploying airbag (OOP), such tightening cannot take place, since the deployment of the airbag is blocked by the occupant. As a consequence of this, the tension strap does not apply the tensile force necessary for releasing the lock. This refinement has the advantage that no electric signal processing is necessary and the airbag unit therefore has greater robustness along with the lower outlay on maintenance associated therewith.

In one refinement, the releasable lock opposes a prestressing force which acts on the closing device and moves the closing device after release from the open position into the closed position. This prestressing force may, for example, be produced by a spring coupled to the closing device. This refinement also has the advantage of being robust.

In another refinement, the lock is formed by a deformation element, the deformation of which can be electrically controlled and which is configured for receiving a control signal from a control unit which produces said signal when the airbag arrangement is activated in the absence of an OOP situation, the deformation element, after receiving the control signal, permitting or bringing about a movement of the closing device from the open position into the closed position by being deformed. For example, the deformation element can be configured as a bending plate. This refinement has the advantage that, with the electric control of the deformation of the deformation element, the movement of the closing device from the open position into the closed position can be controlled at the same time. This enables, for example, different types of OOP situations to be taken into account, and the movement (speed, acceleration) of the closing device to be set accordingly. Also, the open or closed position can be adapted depending on the situation. The closing device may also be prestressed in this refinement, the deformation element opposing the prestressing force. As an alternative, the closing device can be coupled to the deformation element, so that deformation of the deformation element brings about a change in the position of the closing device.

In one refinement of the airbag arrangement, the closing device is formed by a control piston which can be displaced along a longitudinal axis of the housing between the open position and the closed position and the wall of which has a first cutout which, in the open position, comes to lie over the outlet opening, so that, when the airbag arrangement is activated and there is an OOP situation, gas produced by the gas generator exits from the airbag arrangement via the first cutout and the outlet opening.

This refinement is also distinguished by a simple construction and therefore by being robust.

A mechanism which fixes the control piston or control slide in position after displacement into the end position (closed position) are optionally provided. For example, the interior of the housing, in which the control piston is displaceably mounted, can taper in the direction of the closed position, so that the control piston becomes wedged therein when it is transferred from the inoperative position into the end position, and cannot return back into the inoperative position.

The housing of the airbag arrangement preferably has an antechamber, for at least partially accommodating the gas generator, and an airbag chamber for accommodating the airbag in the folded-up state, the antechamber and the airbag chamber being connected by a passage opening through which gas produced by the gas generator can pass from the antechamber into the airbag chamber, and the closing device at least partially closing the passage opening in the open position, and essentially opening it up in the closed position. In the inoperative state, the passage opening is closed or only partially open, depending on the design. If the release device is formed, for example, by a tension strap (see above), then the passage opening is partially open in the inoperative state, so that, when the airbag arrangement is activated by "correspondingly retarded" inflation of the airbag in the absence of an OOP situation, tightening of the tension strap is achieved. If the release device is coupled to an OOP sensor, then the passage opening can be completely closed in the inoperative state.

The control slide preferably has a second cutout which comes to lie over the passage opening in the closed position, so that, when the airbag arrangement is activated and an OOP situation is absent, gas produced by the gas generator enters into the airbag chamber via the second cutout and the passage opening and the airbag is correctly inflated. The coordination of the opening and closing of the outlet and passage openings can therefore be predetermined as desired by suitable construction of the control slide.

In one refinement, the outlet opening and the passage opening and also the first and second cutouts lie opposite each other in each case. Moreover, the outlet opening and the passage opening and also the first and second cutouts can be offset with respect to one another in each case along the axis of displacement of the control slide.

In one preferred refinement, the control slide has a projection which runs essentially perpendicularly with respect to its displacement direction and forms an application surface for gas produced by the gas generator, as a result of which, when the airbag arrangement is activated, a displacement force in the direction of the closed position is exerted on the control slide. The pressure which arises due to the gas produced is therefore used in an advantageous manner in order to set the closing device in motion.

The antechamber is, for example, essentially cylindrical, the control slide being formed by a cylindrical piston which is guided in a sliding manner through the antechamber along its longitudinal axis. In this case, the projection is preferably annular and points into the interior of the piston.

Moreover, the control slide can be coupled to a deformation element which becomes deformed during displacement of the control slide in order thereby to control the displacement speed and/or displacement acceleration of the control slide. Instead of a deformation element, a spring may also be used. The deformation element or the spring furthermore has the effect that the control slide is prestressed in the open position.

In a further refinement, the releasable lock is formed by a pin which runs through the outer walls of the antechamber and the control slide and fixes the control slide relative to the antechamber in the open position. This refinement again has the advantage of a simple construction and robustness.

According to one embodiment of the present invention, the closing device may be coupled to a tension strap which is connected to the airbag, the tension strap being tightened, when the airbag is correctly inflated, and the tension strap exerting a tensile force on the closing device, thereby moving the closing device from the open position into the closed position. As already indicated above, correct inflation refers to unimpeded inflation without obstruction by a vehicle occupant placed too close to the inflating airbag. If the inflation is obstructed, then the tension strap, which is fastened, for example, to the inside of the airbag, on the one hand, and to the closing device, on the other hand, is not tightened and therefore does not exert a tensile force on the closing device. In consequence, the closing device remains in the open position and complete inflation of the airbag is prevented in order to protect the OOP vehicle occupant.

One advantage of this refinement is that the control of the "inflation strength" takes place purely mechanically as a function of the presence of an OOP situation, which makes possible a simple and robust construction of the airbag arrangement.

In particular, in this refinement, the housing can have an antechamber, for accommodating at least part of the gas generator, and an airbag chamber, which is connected to the antechamber and is used to accommodate the folded airbag, the closing device being configured as a sliding element which is guided displaceably in the antechamber in the direction of the tensile force. The connection of the antechamber to the airbag chamber ensures that gas produced by the gas generator also flows into the airbag chamber in the open position of the closing device, the airbag being accommodated in the folded-up state in the airbag chamber so that the gas flowing into the airbag chamber passes into the airbag and therefore inflates the airbag. Since, however, the outlet opening is uncovered in the inoperative state, when the airbag arrangement is activated, initially some of the gas flows out via the outlet opening while only the remaining part of the gas flows into the airbag chamber. As a result, the airbag is initially deployed more slowly than conventional airbags. Only when the tension strap is tightened, this only occurring if nothing is in the way of the deployment of the airbag (i.e. there is no OOP occupant), is the deployment accelerated by virtue of the fact that the tension strap pulls the closing device over the outlet opening in the deployment direction, so that the gas produced now flows completely into the airbag and the latter is completely deployed.

As already mentioned above, it has been found that this initial delay in the complete deployment of the airbag in good time for optimum protection of an occupant is not a hindrance in the "in position situation".

According to one embodiment of the present invention, the antechamber may be essentially box-shaped and the outlet opening is formed in a wall of the antechamber running parallel to the direction of the tensile force, the sliding element including a covering plate which covers the outlet opening in the closed position. In particular, the sliding element can have two covering plates which run parallel to each other and are connected to each other via two clips, the tension cable being fastened to the clips. This refinement permits a particularly simple construction of the airbag arrangement.

According to another embodiment of the present invention, a diffuser is provided at the connecting point of the antechamber and the airbag chamber and deflects gas which is flowing from the antechamber into the airbag chamber laterally into the airbag. As a result, the explosive deployment of the airbag, which acts frontally on a vehicle occupant, is further decreased, since the gas flowing into the airbag chamber is deflected by the diffuser into the lateral regions of the airbag with respect to the axis of the "in position" vehicle occupant airbag arrangement. In combination with controlling the inflation strength using the closing device, a particularly controlled deployment of the airbag both in the "in position" situation and also in the OOP situation is therefore ensured.

The diffuser advantageously has retaining plates by which the airbag is fastened to the housing. In particular, the diffuser can have a diffuser plate which runs essentially parallel to the retaining plates and is offset with respect to them along the direction of the tensile force. This refinement has the advantage that a mechanism for securing the airbag and also a diffuser are provided by a single component, which simplifies the construction of the airbag arrangement and therefore reduces the production costs.

In yet another embodiment of the present invention, the housing has an antechamber, for accommodating at least part of the gas generator, and an airbag chamber, which is connected to the antechamber and is used for accommodating the folded airbag, the closing device being configured as a foldable fabric hose, which is folded up in the open position and which can be deployed by the tensile force in order, as a result, to be transferred into the closed position. The use of a foldable fabric hose results in a reduction in weight and also saving on space, which is advantageous particularly in the case of airbag arrangements in which the amount of space for installation is restricted.

In this refinement, the fabric hose and the antechamber can be cylindrical. As a result, the production in particular of the fabric hose is simplified.

The fabric hose is preferably retained in the folded state by one or more rip cords, and, when the tensile force exceeds a predetermined value, the rip cords rip and open up the fabric hose for deployment. This additionally ensures that the fabric hose remains in the open position in the inoperative state and only transfers into the closed position upon a predeterminable tensile force. This simplifies the adaptability of the airbag arrangement to the various requirements for various types of airbag, in which a transfer from the open position into the closed position may be necessary given different threshold values.

The outlet opening preferably runs parallel to the direction of deployment of the fabric hose in the outer wall of the antechamber and is covered by deployment of the fabric hose. This results in a particularly simple and space-saving construction of the airbag arrangement.

The present invention provides an airbag arrangement, including an airbag; a gas generator for producing gas; a feed for the gas produced by the gas generator into the airbag; a release device for activating the gas generator in an accident; and a control device for the controlled increase in the deployability of the airbag as a function of the positioning of a vehicle occupant, after the gas generator is activated.

An increase in the deployability of the airbag can be realized, firstly, by controlling the inflation process, and, secondly, by controlling the spatial deployment of the airbag.

The increase in the deployability may be achieved by an increase of the feed of gas into the airbag. An increase of the feed of gas into the airbag enables complete inflation of the latter to be achieved. However, this takes place as a function of the position of a vehicle occupant, with the result that, in an OOP situation, only a restricted increase of the feed of gas takes place, if at all. In this case, the positioning is monitored by a sensory mechanism which is provided in the vehicle and is generally known. The control device evaluates the results of the monitoring in order to control the feed of gas.

In one refinement, the gas generator can be operated successively in a first and a second ignition stage, the control device adapting the feed of gas into the airbag, when the second stage is ignited, as a function of the positioning of a vehicle occupant. For example, in an OOP situation, when the second stage is ignited, the feed of gas into the airbag is restricted or even shut off in order to prevent complete inflation of the airbag. As a result, for example, the acceleration of a vehicle occupant's head is reduced.

The airbag arrangement can furthermore have a housing for accommodating a gas discharge of the gas generator, the housing including at least one outlet opening with an adjustable cross section, and it being possible for the feed of gas into the airbag to be controlled by controlling the cross section. The outlet opening preferably points in the direction of the instrument panel. In addition, the housing can have at least one opening for feeding the gas produced by the gas generator into the airbag, the cross section of which opening can likewise be adjusted. In this case, when the second stage is ignited in an OOP situation, the opening of the feed of gas to the airbag is closed and at the same time the outlet opening is opened in the direction of the instrument panel. The gas of the second stage is therefore kept virtually completely away from the vehicle occupant and blown under the instrument panel.

The control device is preferably formed by a control slide which is arranged displaceably in the airbag arrangement, and the feed of gas into the airbag depends on the displacement and/or positioning of said control slide within the airbag arrangement. In this refinement, the cross section of the outlet opening and/or of the gas feed opening to the airbag can be adjusted using displacement of the control slide.

The control slide can advantageously be acted upon by gas produced by the gas generator and, as a result, can be displaced. In this refinement, a control of the feed of gas into the airbag is possible with particularly simple mechanical mechanism.

In a further refinement, the outlet opening is adjoined by a gas duct which is used for conducting gas flowing out through the outlet opening to a further airbag. A further airbag of this type may, for example, be a knee airbag. The positive pressure prevailing in the pressure space (i.e. the chamber containing the gas discharge) is therefore used in order to inflate the knee airbag via the gas duct. The outlet opening or overflow opening is closed again by the control device after the further airbag is filled.

In another refinement, the increase in the deployability of the airbag is achieved by a rebound strap which initially restricts complete deployment of the airbag and which is accommodated releasably in the airbag arrangement, so that the spatial deployment of the airbag can be realized by release of the rebound strap. The release of the rebound strap is controlled by a suitable sensory mechanism which detects the position of vehicle occupants.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DESCRIPTION

Figure 1:
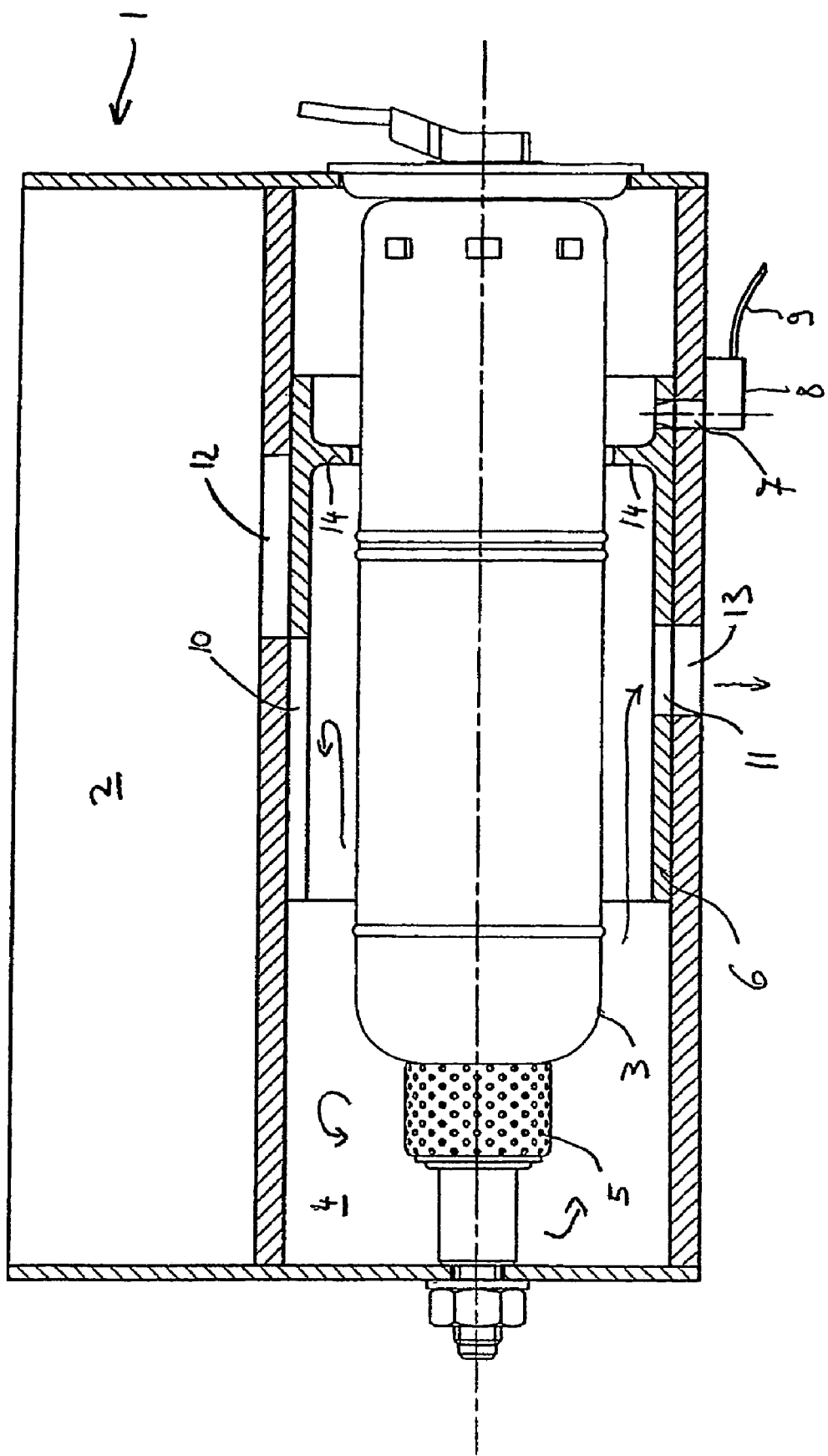
FIG. 1 is a schematic cross section through an airbag arrangement in the inoperative state according to a first exemplary embodiment of the invention.

FIG. 1 shows, schematically, a cross section through part of an airbag arrangement 1. The airbag arrangement 1 comprises an airbag chamber 2 in which an airbag (not shown) is accommodated in the folded state. The airbag arrangement 1 furthermore comprises a gas generator 3 which is provided in a cylindrical chamber 4 which is separated off from the airbag chamber 2. The gas generator 3 has, at one end, exit openings 5 through which the gas flows out of the gas generator 3 into the cylindrical chamber 4.

The airbag arrangement 1 furthermore comprises a control slide 6 which is a cylindrical shape and the outside diameter of which essentially corresponds to the inside diameter of the cylindrical chamber 4, so that the control slide 6 is guided in a sliding manner in the cylindrical chamber 4. FIG. 1 shows the control slide 6 in its inoperative position in which it is locked by a pin 7 running in cutouts 7a through the walls of the cylindrical chamber 4 and of the control slide 6. This lock is assigned to a release device 8 which releases the lock when a release signal is received via a supply line 9 and therefore unlocks the control slide 6, so that the latter is axially movable within the cylindrical chamber 4. The lock may be realized, for example, by a piezo release element.

The control slide 6 has first and second pass-through openings 10 and 11 which lie opposite one another perpendicular with respect to a longitudinal axis. The first pass-through opening 10 points in the direction of the airbag chamber 2 while the second pass-through opening 111 faces away in the opposite direction from the vehicle interior. The cylindrical chamber 4 has first and second outlet openings 12 and 13 which likewise lie opposite each other perpendicular with respect to the longitudinal axis of the cylindrical chamber 4. The first outlet opening 12 provides a connection from the interior of the cylindrical chamber 4 to the airbag chamber 2 in order to inflate the airbag stowed in it. The second outlet opening 13 enables the gas to escape from the chamber 4 in an OOP situation, as will be described in more detail below.

In the inoperative state shown in FIG. 1, the second pass-through opening 11 overlaps with the second outlet opening 13. As a result, gas which is blown by the gas generator 3 into the chamber 4 can escape through these two openings. At the same time, the first outlet opening 12 is concealed by the wall of the control slide 6. In this state, the first pass-through opening 10 does not overlap with the first outlet opening 12, but rather is offset axially.

In an accident, an activation of the airbag arrangement 1, i.e. a release of the airbag, takes place in a conventional or well known manner. In the process, the gas generator 3 produces gas to inflate the airbag. The vehicle which is equipped with the airbag arrangement 1 now has sensors which recognize an OOP situation. Sensors of this type are generally known and are therefore not described in more detail here. As a function of the output signals of these sensors, a control unit provided in the vehicle produces a release signal which is fed to the release device 8 via the supply line 9. In the event of an OOP situation, the control unit does not produce a release signal, and so the release device 8 does not bring about a release of the control slide 6.

In this case, the control slide 6 therefore remains in the inoperative position shown in FIG. 1. The gas generator 3 is activated at the same time by a release signal (which is independent of the release signal produced by the control unit), so that gas flows through the exit openings 5 into the interior of the chamber 4. Since, however, the first outlet opening 12 is closed, the entire amount of gas flows through the open, opposite outlet opening 13. The airbag is therefore not inflated and the OOP vehicle occupant is protected from possible injuries. The direction of flow of the gas is indicated schematically in FIG. 1 by arrows.

Figure 2:
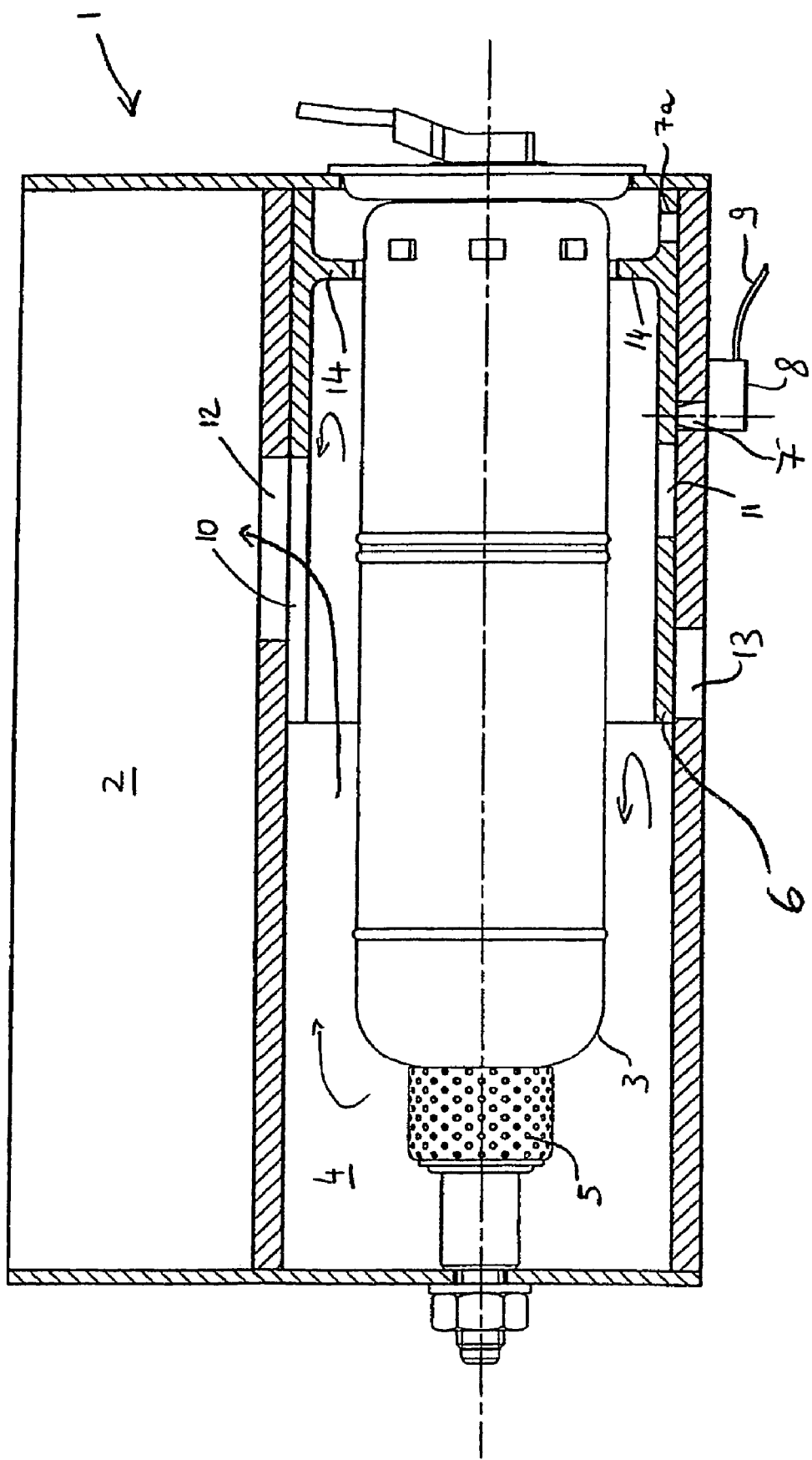
FIG. 2 is a schematic cross section through the airbag arrangement from FIG. 1 after activation.

FIG. 2 shows the airbag arrangement 1 for the case in which no OOP situation has been determined and the airbag can consequently be released correctly. In this case, the abovementioned control unit which is provided in the vehicle produces a release signal which causes the release device 8 to release the control slide 6.

After release, the control slide 6 is moved from the inoperative position shown in FIG. 1 axially into the end position shown in FIG. 2 by the gas which is produced by the gas generator 3 and flows into the chamber 4. The energy required for moving the control slide 6 is supplied here by the gas which flows into the chamber 4, acts on an application surface formed by a projection 14 protruding into the cylindrical interior of the control slide 6 and thereby sets the control slide 6 axially in motion. The direction of flow of the gas is again indicated schematically in FIG. 2 by arrows.

In the end position of the control slide 6 which is shown in FIG. 2, the first pass-through opening 10 comes to lie under the first outlet opening 12, thus providing a connection between the interior of the cylindrical chamber 4 and the airbag chamber 2, and the gas produced by the gas generator 3 can flow unimpeded from the cylindrical chamber 4 into the airbag chamber 2. At the same time, the second outlet opening 13 is closed by the wall of the control slide 6. The second pass-through opening 11 which, in the inoperative position, is still positioned above the second outlet opening 13 is now offset axially with respect to the latter.

In the end position of the control slide 6 shown in FIG. 2, the airbag is consequently deployed and inflated in an unimpeded manner.

Figure 3:
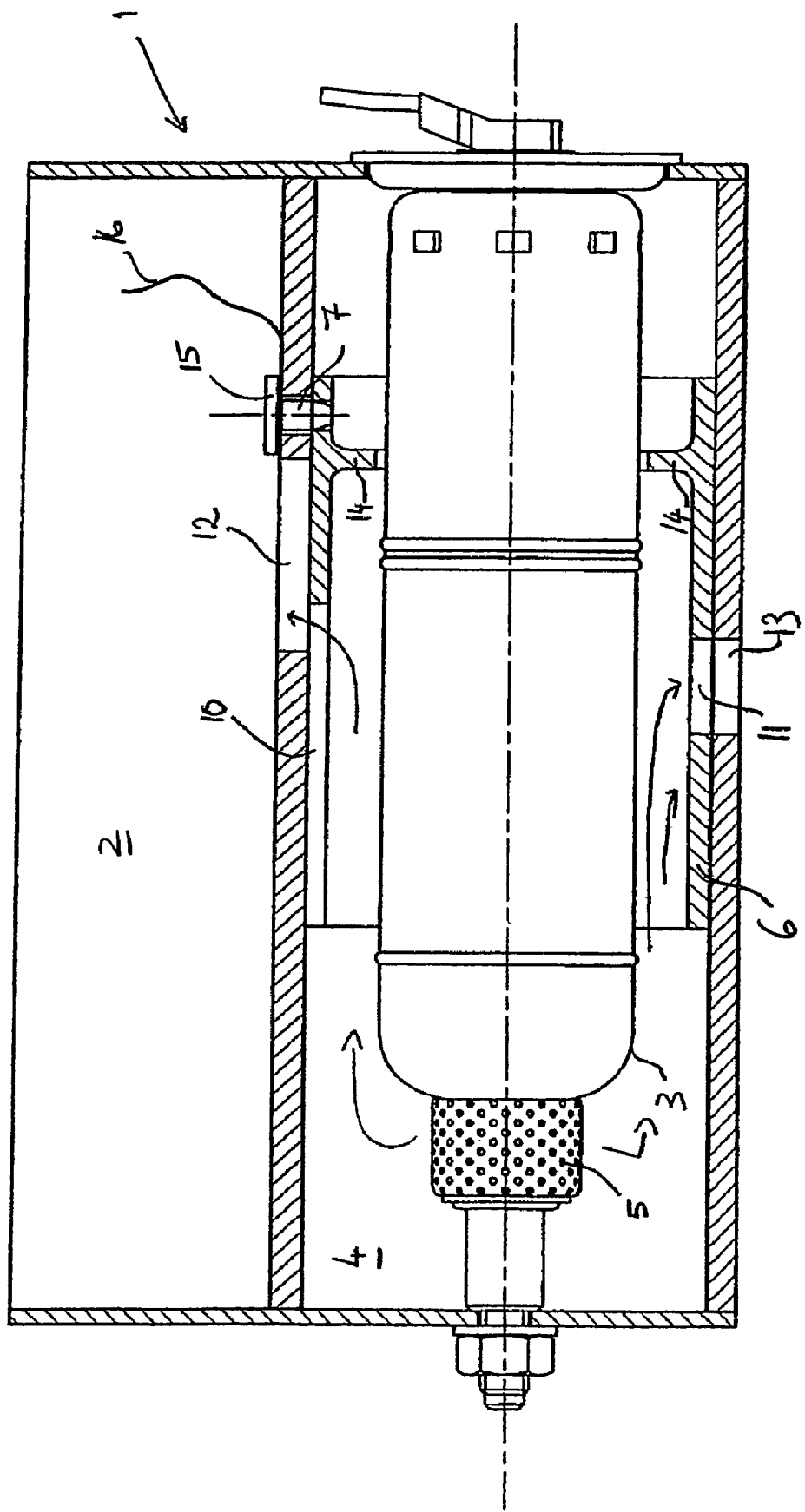
FIG. 3 is a schematic cross section through an airbag arrangement in the inoperative state according to a variant of the first exemplary embodiment.

FIG. 3 shows an airbag arrangement 1 according to one embodiment of the invention, with the control slide 6 in its inoperative position. In contrast to the airbag arrangement 1 from FIG. 1, the first pass-through opening 10 and the first outlet opening 12 partially overlap in the inoperative state. This overlapping is achieved by adaptation of the axial extent of the first pass-through opening 10 and/or of the first outlet opening 12. As a result, there is also a connection between the interior of the cylindrical chamber 4 and the airbag chamber 2 in the inoperative position of the control slide 6. However, the overlapping is so slight that, when the gas generator 3 is triggered, only a limited flow of gas from the cylindrical chamber 4 into the airbag chamber 2 can take place, compared to a complete opening of the second outlet opening 12.

A further difference from the airbag arrangement 1 from FIG. 1 is the locking of the control slide 6 in its inoperative position. As in the first exemplary embodiment, the locking is brought about by a pin 7; however, in contrast to this, the pin 7 is provided on a side lying opposite perpendicular with respect to the axis of the cylindrical chamber 4 in a cutout 7a in the walls of the control slide 6 and of the chamber 4. The pin 7 includes a head 15 that protrudes into the airbag chamber 2. One end of a rebound strap 16, which is fastened at its other end to the upper plate of the airbag (not shown), is connected to the head 15. In this case, the length of the rebound strap 16 is shorter than the distance of the upper plate of the airbag in its completely inflated state from the wall of the chamber 4.

In the inoperative position of the control slide 6 shown in FIG. 3, the second pass-through opening 11 and the second outlet opening 13 lie one above the other in the same manner as in the airbag arrangement shown in FIG. 1, with the result that gas produced by the gas generator 3 is able to flow away from the vehicle interior.

There are now two scenarios for the deployment of the airbag. In the first scenario, the sitting position of the vehicle occupant with respect to the airbag to be inflated is correct ("in position" in contrast to OOP), and so, after release, the airbag can be deployed and inflated in an unimpeded manner. The airbag is inflated relatively slowly over a first period of time, since the flow of gas into the airbag chamber 2 that is made possible by the overlap of the openings 10 and 12 is restricted and the gas flows out through the openings 11 and 13 which lie one above the other.

As soon as the airbag has inflated to such an extent that the rebound strap 16 between the upper plate of the airbag and the pin head 15 is tensioned and the inflating process is furthermore not obstructed by an OOP vehicle occupant, then the tensile force exerted on the pin 7 by the rebound strap 16 is greater than the force with which the pin 7 is retained in the cutout. Further inflation of the airbag therefore brings about a release of the control slide 6 by the pin 7 being pulled out by the rebound strap 16.

Figure 4:
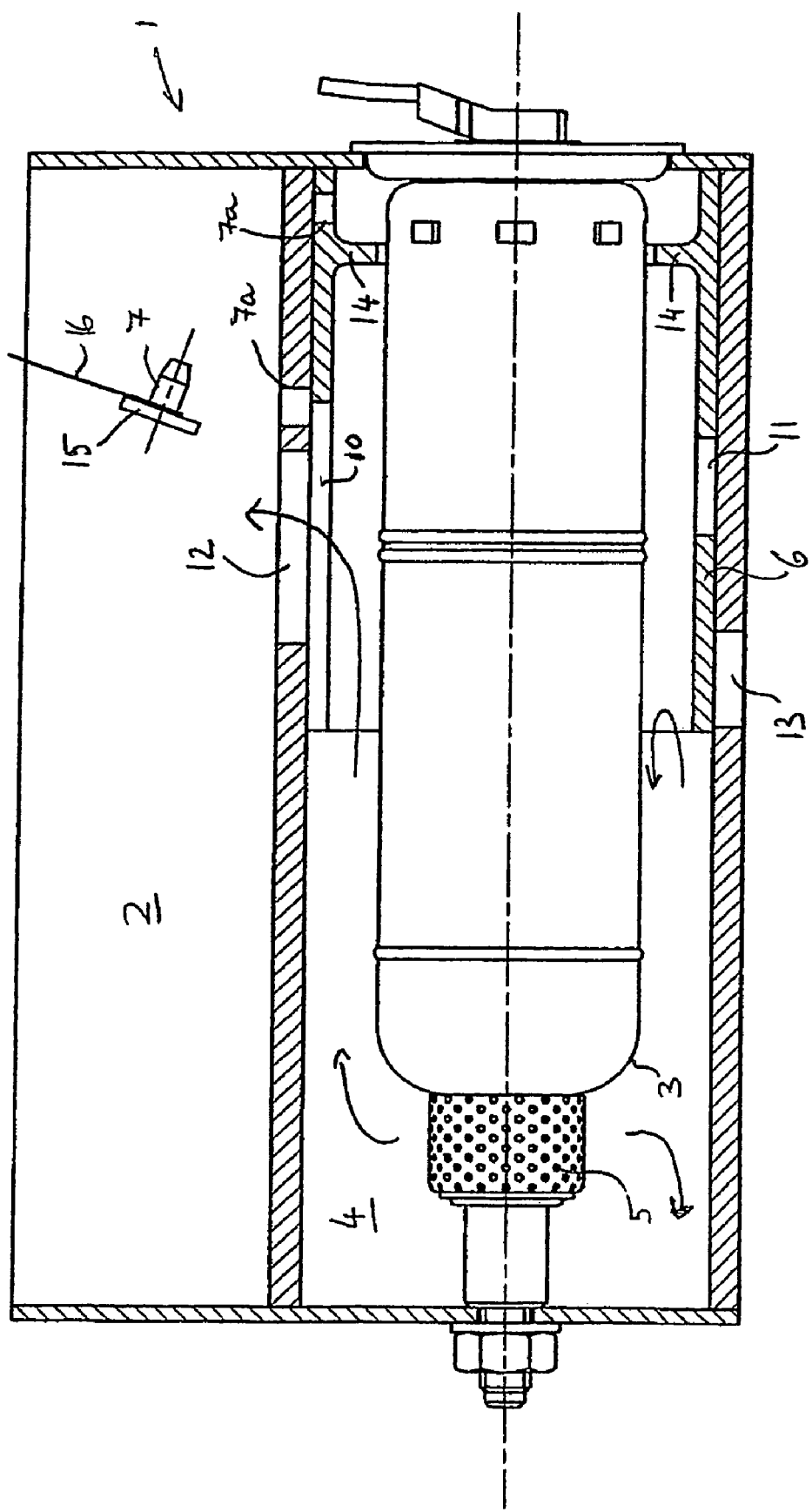
FIG. 4 is a a schematic cross section through the airbag arrangement from FIG. 3 after activation.

This is illustrated schematically in FIG. 4. The rebound strap 16 is tightened and the distance of the upper plate of the airbag from the wall of the chamber 4 is already greater than the length of the rebound strap 16, and so the pin 7 is torn out of the cutouts 7a in the walls of the chamber 4 and of the control slide 6. After the axial fixing of the control slide 6 is removed, the latter is displaced axially by the gas produced by the gas generator 3, as already explained with reference to FIG. 2. The flow of gas is again indicated schematically in FIGS. 3 and 4 by arrows.

The axial displacement of the control slide 6 brings about complete opening of the first outlet opening 12 while the second outlet opening 13 is closed. This corresponds to the process described with reference to FIGS. 1 and 2. The gas produced by the gas generator 3 now flows completely through the openings 10 and 12 into the airbag, which is completely deployed and inflated as a result. In this second period of time after the control slide 6 is released, the inflation process is therefore greatly accelerated in comparison to the first period of time before its release. Despite the intended initial delays, the airbag is deployed rapidly enough in order to provide the vehicle occupant with the best possible protection.

In a second scenario, the vehicle occupant is "out of position" (OOP situation). In this case, the vehicle occupant blocks the airbag as it is being deployed. Owing to the fact that the inflation of the airbag during the above-mentioned, first period of time and the associated build-up of pressure in the airbag are reduced, the force acting on the airbag by the OOP vehicle occupant is greater than the expansion force of the airbag that acts in the reverse direction, with the result that, from the moment in which an equilibrium of these opposed forces occurs, the entire amount of gas produced there by the gas generator 3 flows through the second outlet opening 13. A further inflation of the airbag is therefore prevented, as a result of which tightening of the rebound strap 16 and the associated release of the control slide 6 do not occur either.

The state illustrated in FIG. 4 therefore does not occur at all in the second scenario. The vehicle occupant is thereby protected from the consequences of complete inflation of the airbag in the OOP situation.

Figure 5:
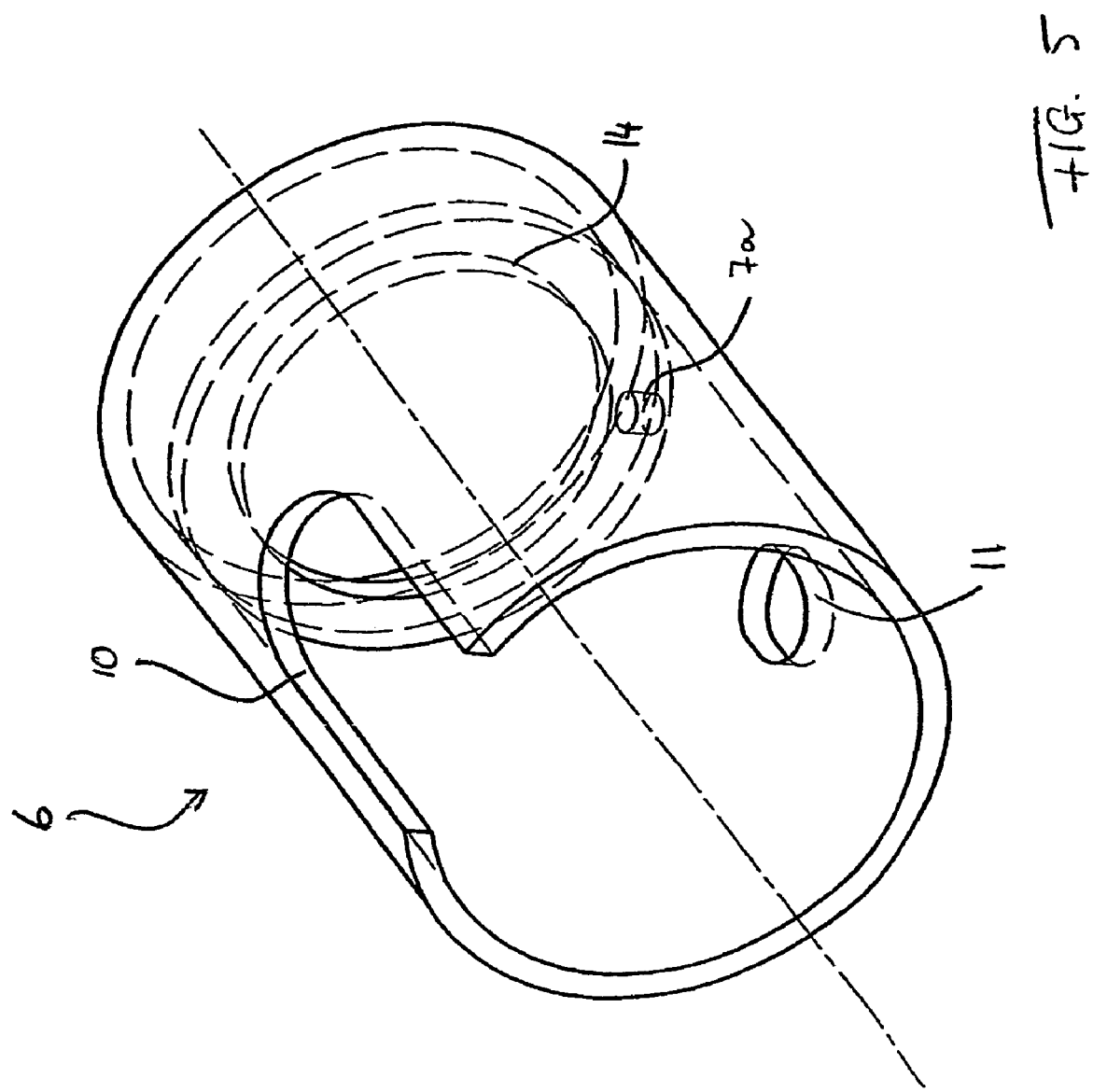
FIG. 5 is a schematic illustration of one refinement of the closing device.

FIG. 5 schematically illustrates the control slide 6 of the first exemplary embodiment. As already mentioned, the control slide 6 is cylindrical and is open at both ends. As explained above, the control slide 6 has first and second pass-through openings 10 and 11 in its wall. The first pass-through opening 10 is realized by a U-shaped clearance cut while the second pass-through opening 11 is formed by a hole in a region of the wall which lies opposite perpendicular with respect to the axis of the cylinder. In terms of area, the second pass-through opening 11 is smaller than the first pass-through opening 10. The dimensions of the openings 10 and 11 can be defined in accordance with the required inflation behavior of the airbag and outlet behavior away from the vehicle interior.

Furthermore, the control slide 6, as likewise already mentioned, has a cutout 7a for receiving the pin 7, which is used to lock the control slide 6 in the chamber 4, and also an annular projection 14 which protrudes concentrically into the interior of the control slide 6, in order to provide an application surface for gas produced by the gas generator 3, as explained with reference to FIGS. 1 to 4.

Figure 6:
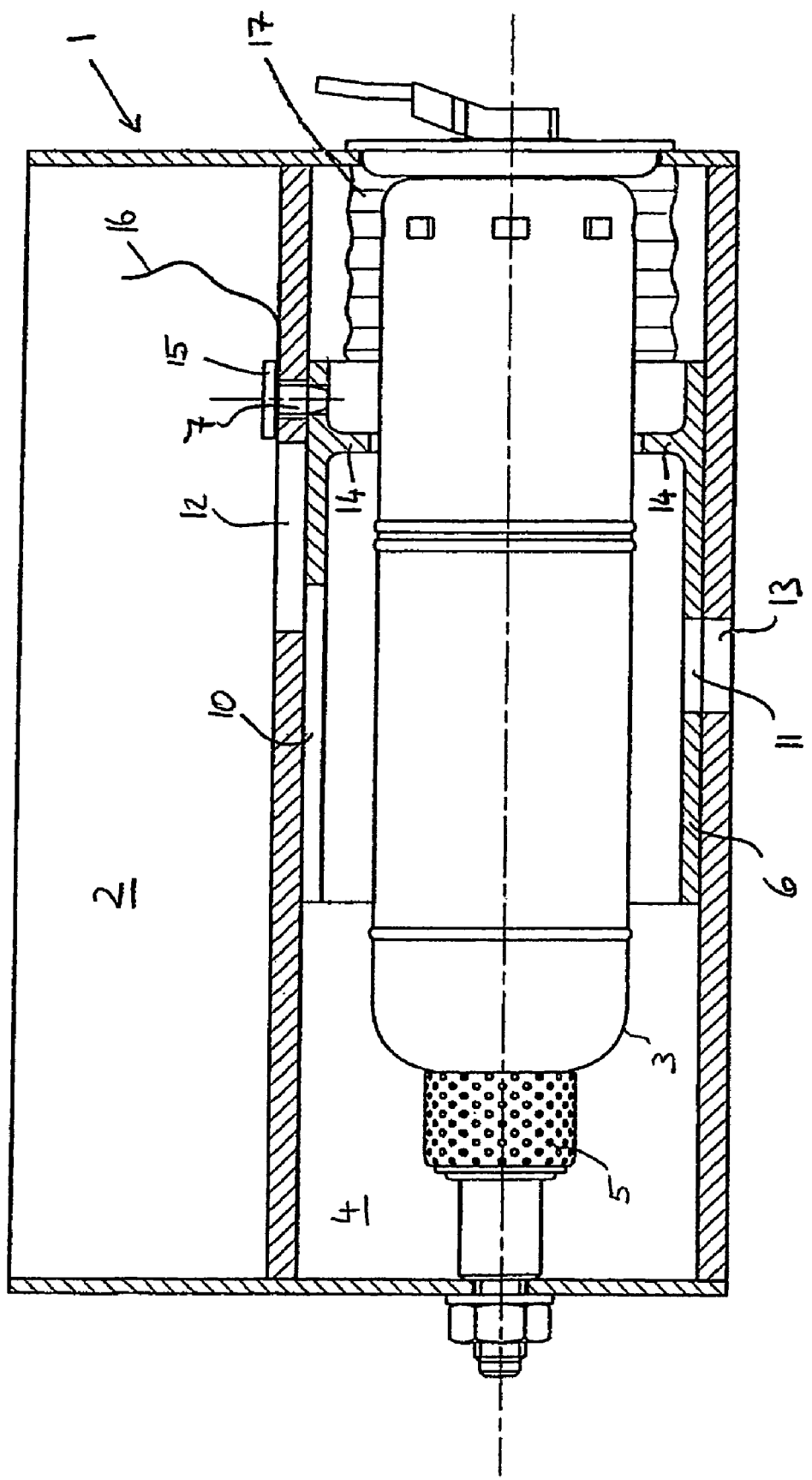
FIG. 6 is a schematic cross section through an airbag arrangement according to a variant of the first exemplary embodiment.

FIG. 6 shows a variant embodiment of the airbag arrangement 1 from FIG. 3. In this variant embodiment, a deformation element 17 is fitted between the control slide 6 and an inner wall of the housing of the airbag arrangement 1 so that it is deformed when the control slide 6 is released, and brakes its axial movement in order to open the outlet opening 12. In this case, the braking action can be defined as desired by suitable selection of the structure of the deformation element 17, so that the movement process and the profile thereof can be better controlled. The deformation element 17 may be realized, for example, by a bending plate. As an alternative, the deformation element 17 may be constructed so that its deformation characteristics can be controlled by an electric signal, for example as a function of the deceleration of the vehicle in an accident, or of the sitting position of the vehicle occupant. In every case, the provision of a deformation element enables the "on set" of the mass flow of gas into the airbag to be adjusted better.

The deformation element may also be configured so that it slides the control slide 6 back again from the end position into the starting position after complete ignition of the gas generator 3, and therefore has the action of a spring. This can be realized, for example, using an electric controller that contains, for example, a piezo element.

In one variant embodiment (not shown), the deformation element 17 also takes on the function of the locking of the control slide 6. In this variant embodiment, the deformation behavior can be electrically controlled, with the result that the control slide is locked in the inoperative state while, when the airbag arrangement 1 is activated, a deformation is triggered, so that the control slide 6 is movable axially. For example, in this variant embodiment, the deformation element 17 can be realized by a piezo element.

Figure 7:
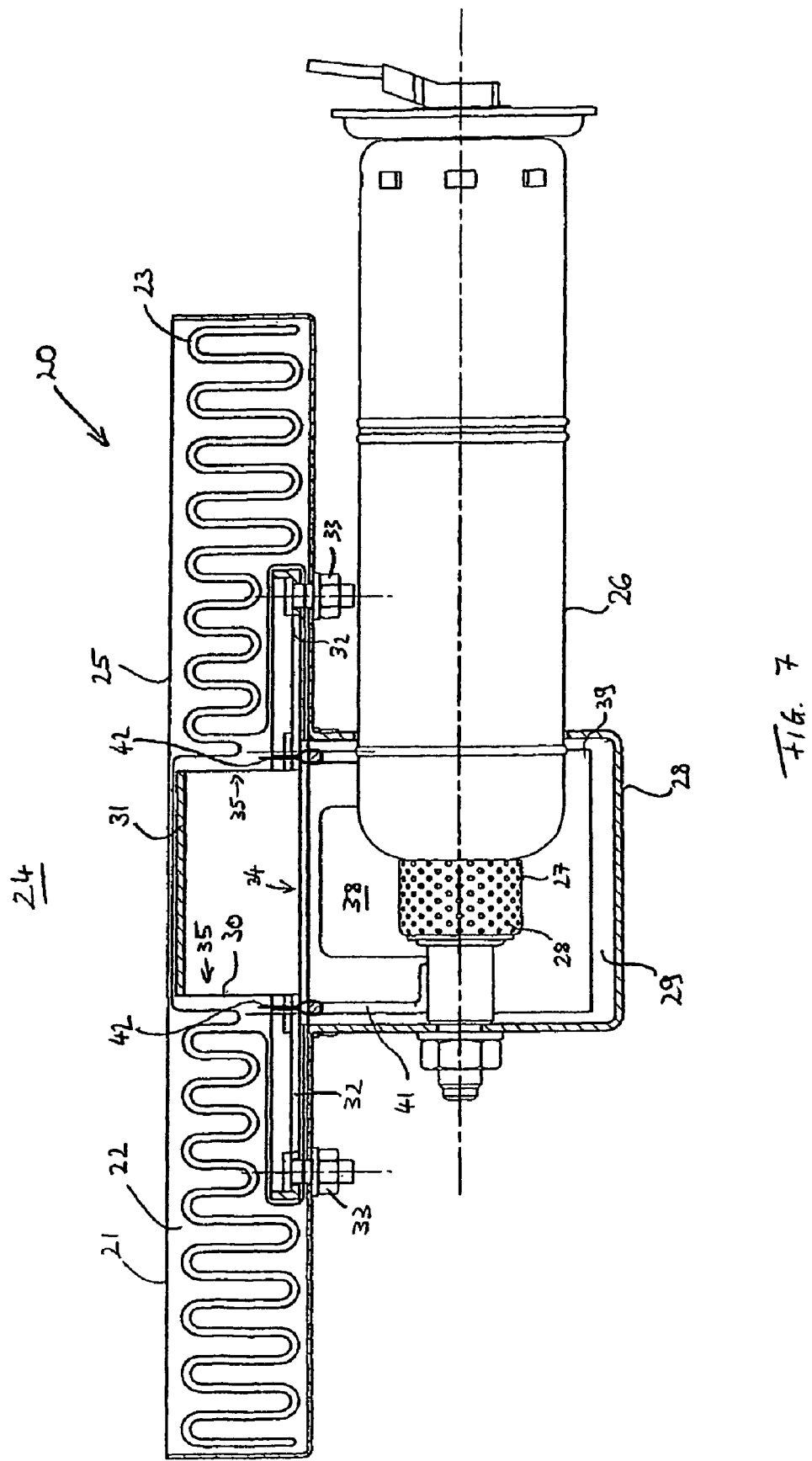
FIG. 7 is a schematic cross section through an airbag arrangement in the inoperative state according to a second exemplary embodiment of the invention.

FIG. 7 shows an airbag arrangement 20 according to a second exemplary embodiment of the invention. The airbag arrangement 20 comprises an airbag chamber 22 which is formed by a first housing part 21 and in which an airbag 23 is accommodated in folded form, and the end surface 25 of which, which points in the direction of the vehicle interior 24, has a rip seam (not shown) which is ripped open when the airbag 23 is inflated, so that the airbag 23 can be deployed into the vehicle interior 24.

The airbag unit 20 furthermore comprises a gas generator 26 which has, at one end, an air exit element 27 with air exit openings 28. The air exit element 27 is arranged in a chamber 29 which is formed by a second housing part 28, is open toward the airbag chamber 22 and is arranged centrally relative to the airbag chamber 22.

Furthermore, a retaining element 30 comprising a retaining plate 31 and a diffuser 32 is provided in the airbag chamber 22. The retaining plate 31 is fastened by screws 33 to that wall 34 of the first housing part 21 which lies opposite the end surface 25. Moreover, the retaining element 30 is arranged within the folded airbag 23 so that free ends 35 of the airbag 23 run between the retaining plate 31 and the wall 34 and are likewise fastened by the screws 33 to the first housing part 21.

The diffuser 31 is arranged above an air passage 34 by which the airbag chamber 22 is connected to the chamber 29 so that gas which is produced by the gas generator 26 and emerges out of the air exit element 27 flows into the airbag chamber 22 and inflates the airbag 23. The diffuser 31 laterally deflects gas flowing into the airbag chamber 22; that is to say, the gas passing through the air passage 34 strikes against the inner surface of the diffuser 31 that faces the latter and flows through lateral openings 35, which are formed between the diffuser 31 and the lower part 32, into the airbag 23 and inflates the latter. The diffuser 31 is consequently used to achieve a more uniform inflation of the airbag 32 concentrated less on the center thereof.

Figure 8:
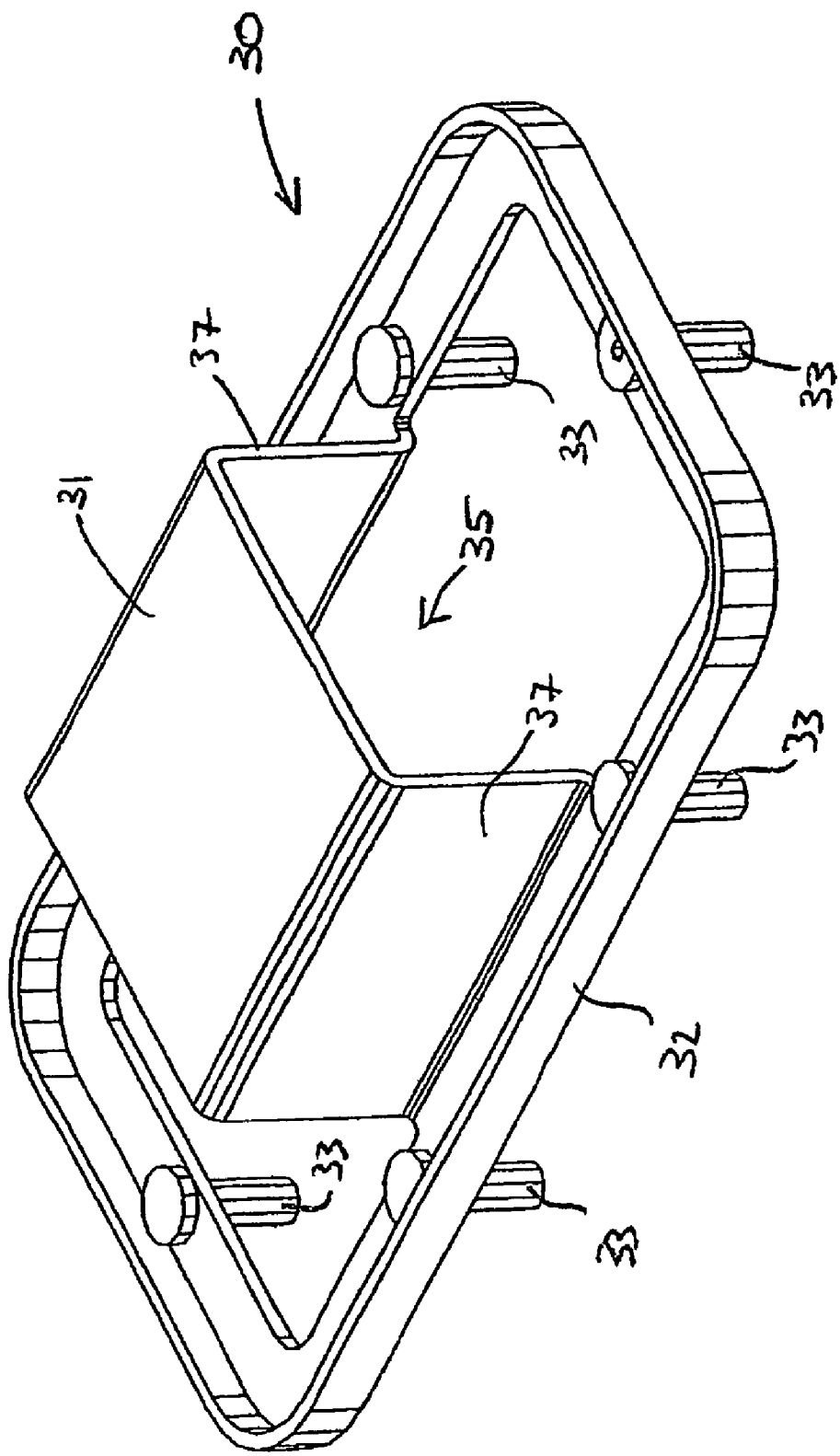
FIG. 8 is a schematic illustration of one refinement of the diffuser.

FIG. 8 shows a detailed view of the retaining element 30. The reference numbers of FIG. 8 correspond to those from FIG. 7. As can be seen in FIG. 8, the diffuser 31 is connected to the retaining plate 32 by two opposite side parts 37. The openings 35 are formed perpendicular to the diffuser between the side parts.

As is furthermore schematically illustrated in FIG. 7, the second housing part 28 has two air outlet openings 38 perpendicular to the plane of the picture. Furthermore, a slide 39 which can be displaced perpendicularly to the diffuser 31 along the air outlet openings 38 is arranged within the chamber 29.

Figure 9:
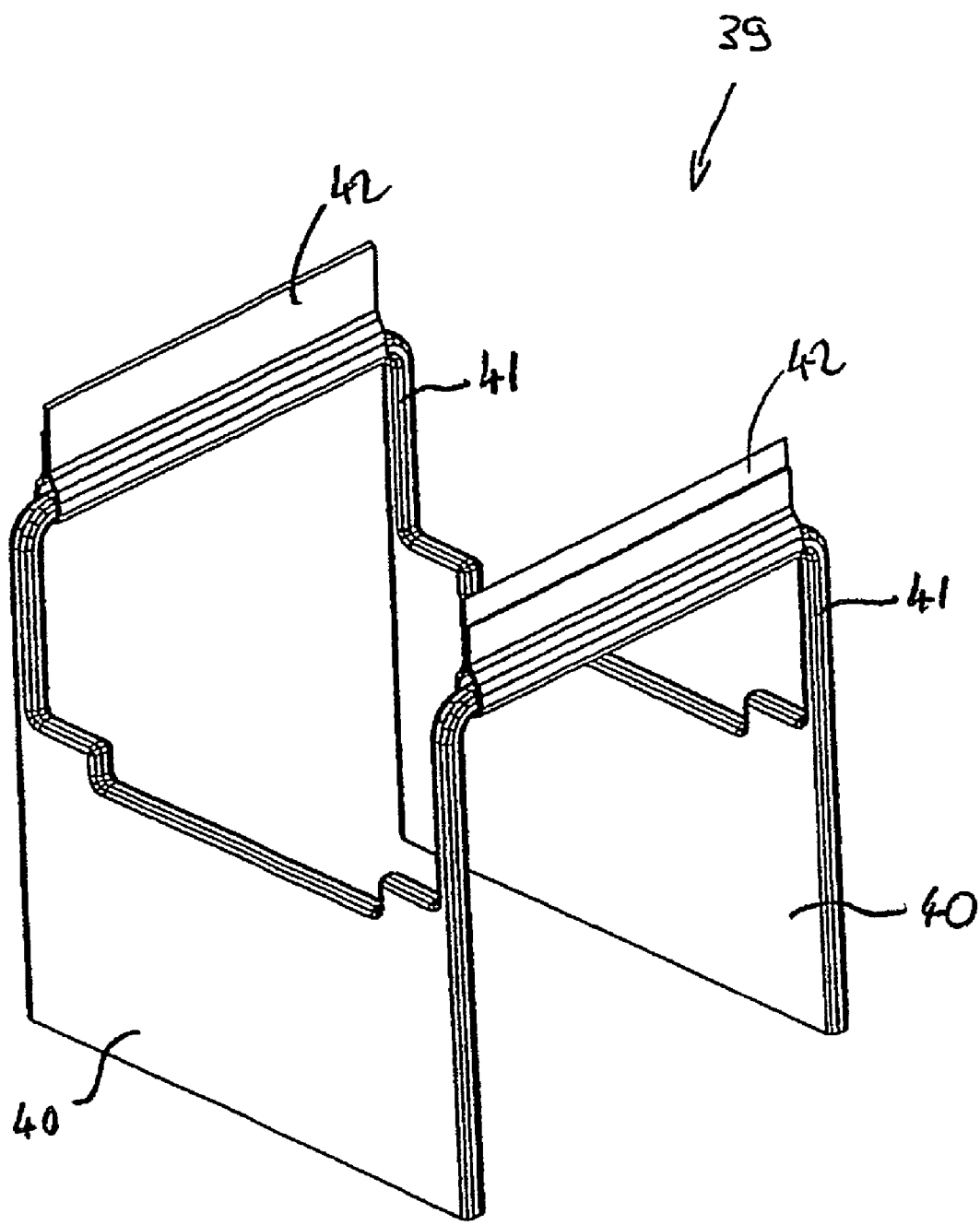
FIG. 9 is a schematic illustration of a further refinement of the closing device.

FIG. 9 shows a more detailed view of the slide 39. The latter has two side walls 40 which run parallel to each other and are connected to each other via two clips 41. The ends of a rebound strap 42 are connected to these clips 41. The central part of the rebound strap 42 is connected to the inside of the airbag 23.

In FIG. 7, the slide 39 is shown in its inoperative position. In the inoperative position, the side walls 40 are situated below the outlet openings 38. When the airbag is inflated, the outlet openings are therefore open, so that the air flowing out of the air exit openings 28 not only flows through the air passage 34 into the airbag chamber 22, but, at least initially, also escapes to the outside through the outlet openings 38.

Over the course of a correct deployment of the airbag 23 (i.e. in the "in position" situation), the rebound straps 42 are tightened and the slide 39 is pulled upward by the rebound straps 42, so that the side walls 40 of the slide 39 come to lie over the air outlet openings 38 and thereby close the latter. Further escape of the gas produced by the gas generator 26 is therefore prevented, and so the airbag 23 can be deployed to its maximum size.

Figure 10:
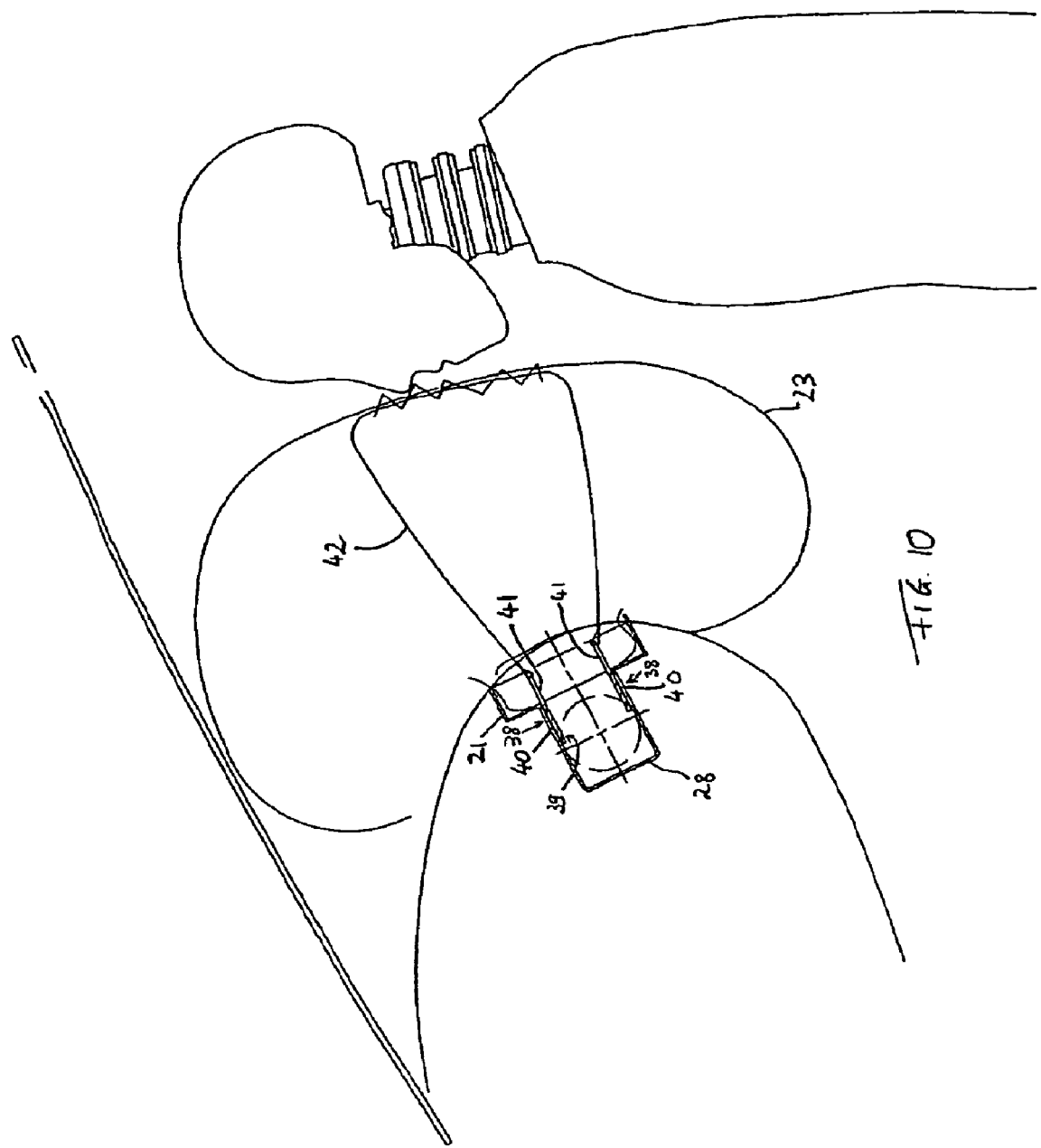
FIG. 10 is a schematic illustration of the deployment of the airbag in the "in position" situation.

This case is illustrated schematically in FIG. 10. The rebound straps 42 have been tensioned by the complete, inflated airbag and have brought about a displacement of the slide 39 upward (i.e. in the direction of the airbag 23) and therefore a closing of the outlet openings 38. The free deployment of the airbag additionally brings about an aspiration effect, i.e. that air is sucked in from the outside through the outlet openings 38 which are initially still open. The illustrated state occurs approximately 10 to 15 milliseconds after the airbag 23 is ignited.

Figure 11:
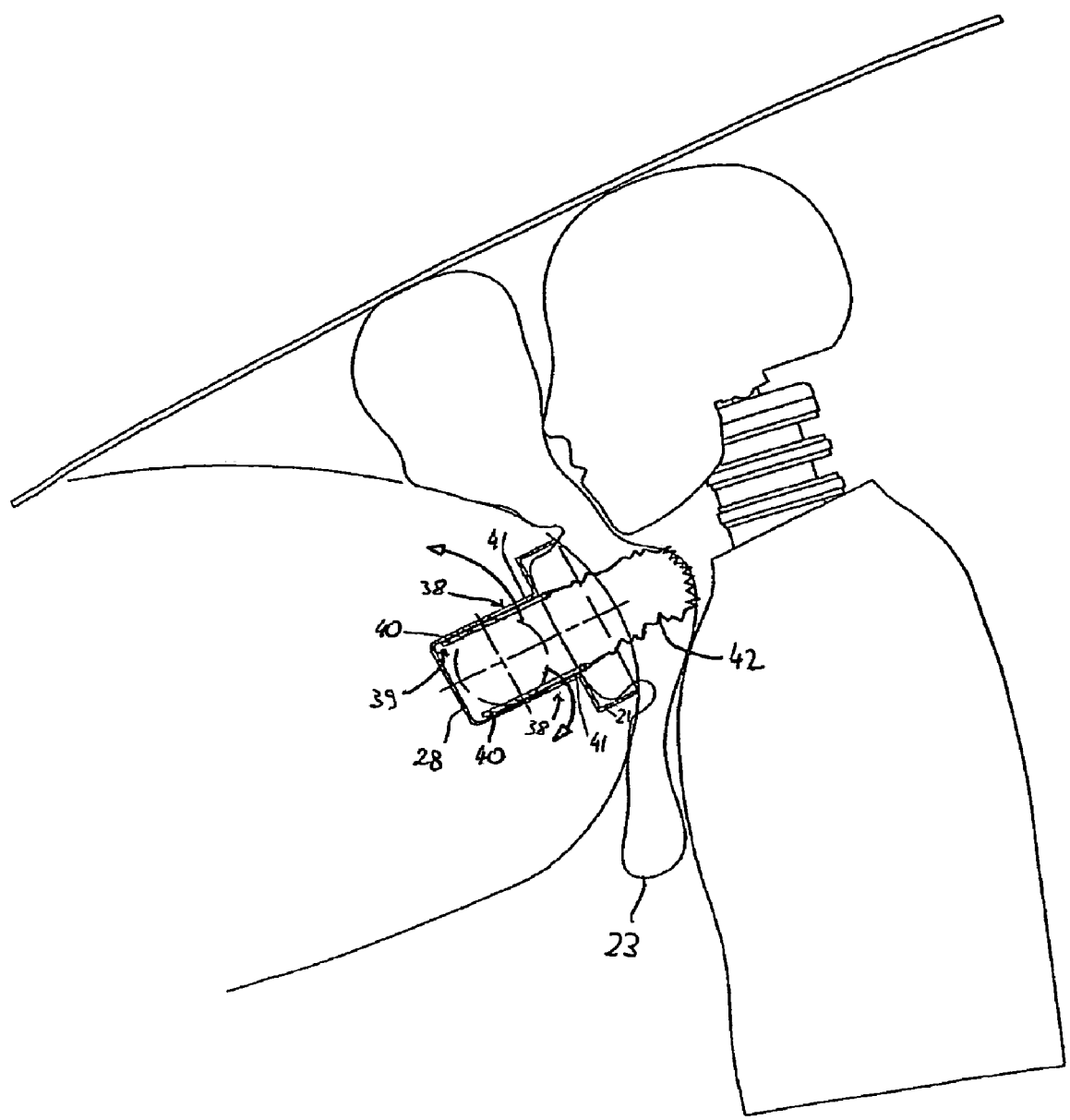
FIG. 11 is a schematic illustration of the deployment of the airbag in the OOP situation.

The opposite situation is illustrated in FIG. 11. A vehicle occupant here is "out of position" and thereby blocks a correct inflation of the airbag 23. As a result, self-tensioning of the rebound straps 42 is prevented or delayed at the same time, which in turn has the consequence that the slide 39 remains completely or for longer in its inoperative position. The outlet openings 38 therefore remain open completely or for longer, so that the air produced by the gas generator 26 can escape through them (indicated schematically by arrows). An explosive inflation of the airbag 23 is therefore prevented, and the vehicle occupant is correspondingly protected.

Figure 12:
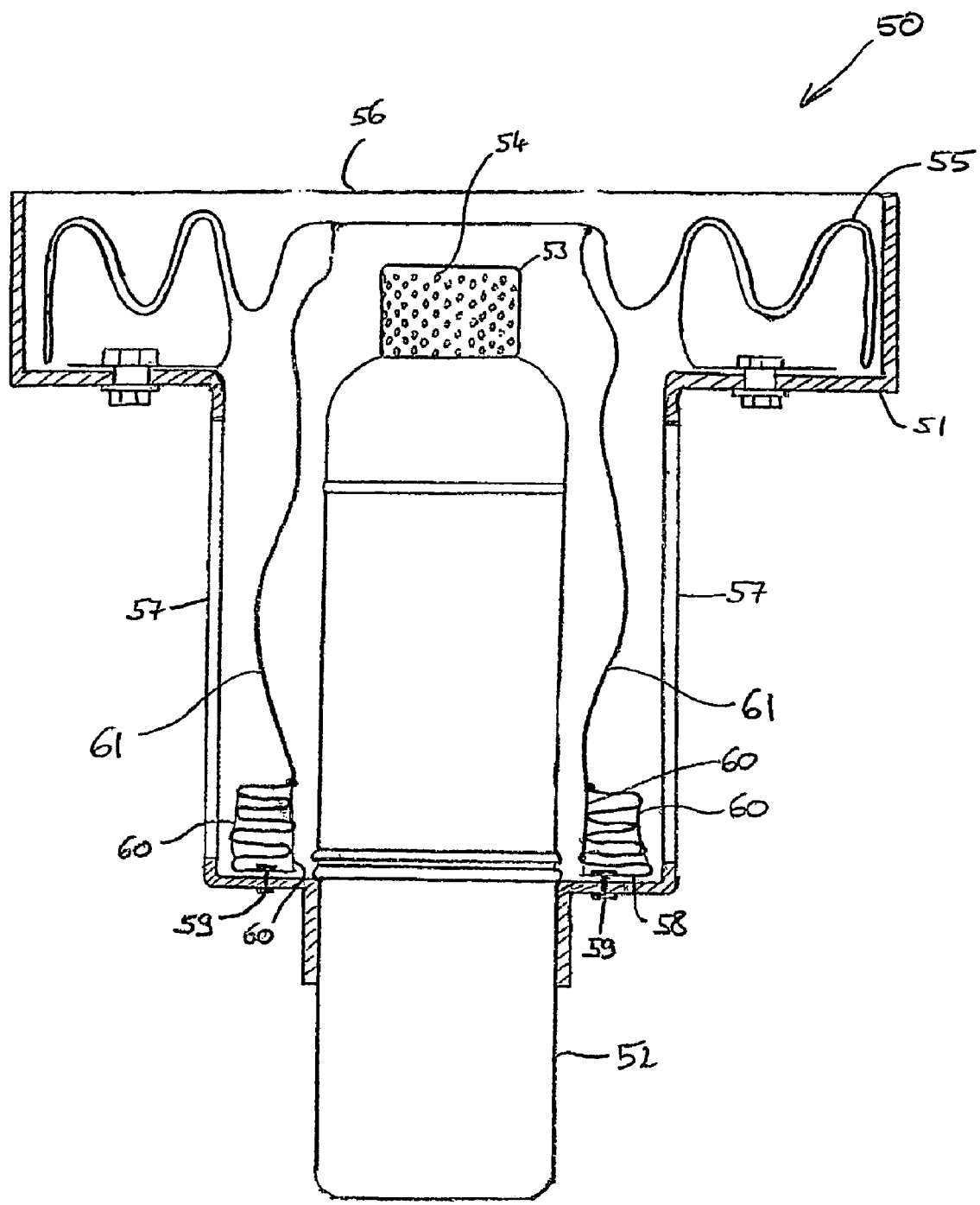
FIG. 12 is a schematic cross section through an airbag arrangement according to a third exemplary embodiment of the invention.

FIG. 12 shows, schematically, an airbag arrangement 50 according to a third exemplary embodiment of the invention. The airbag arrangement 50 comprises a housing 51 in which a gas generator 52 is partially accommodated. As in the other exemplary embodiments, the gas generator 52 has an air exit element 53 with air exit openings 54. An airbag 55 is accommodated in the folded state in the upper, wider part of the housing 51 and can be deployed into the vehicle interior by a rip seam (not shown) in an end surface 56 of the housing 51.

The housing 51 has lateral air outlet openings 57. A folded, cylindrical fabric hose 58 is arranged in the housing 51, at the end of said housing which is opposite the end surface 56, the lower end of said fabric hose being attached to the housing 51 via a fastening 59. The folds of the fabric hose 58 are connected to one another via rip cords 60, with the result that the fabric hose 58 remains folded in the inoperative state of FIG. 12. The upper end of the fabric hose 58 is connected to the inside of the airbag 55 via rebound straps 61.

When the airbag 55 is inflated in the "in position" situation, the deployment thereof is not braked by an erroneously positioned vehicle occupant, and so the expansion of the airbag 55 brings about a tightening of the rebound straps 62, ripping of the rip cords 60 and deployment of the fabric hose 58. The deployed fabric hose 58 runs over its length along the outlet openings 57 and thereby covers them. The gas produced by the gas generator 52 cannot therefore escape through the outlet openings 57, but rather, after the fabric hose 58 is deployed, flows completely into the airbag 55. This is therefore completely deployed, as FIG. 10 shows.

In the OOP situation, the deployment of the airbag 55 is obstructed by the vehicle occupant, as FIG. 11 shows. In this case, the rebound straps 61 are not tightened and the fabric hose 58 is not deployed. During production of gas by the gas generator 52, a large part of the gas which is produced escapes through the outlet openings 57, as a result of which complete inflation of the airbag 55 is prevented in order to protect the vehicle occupant.

Figure 13:
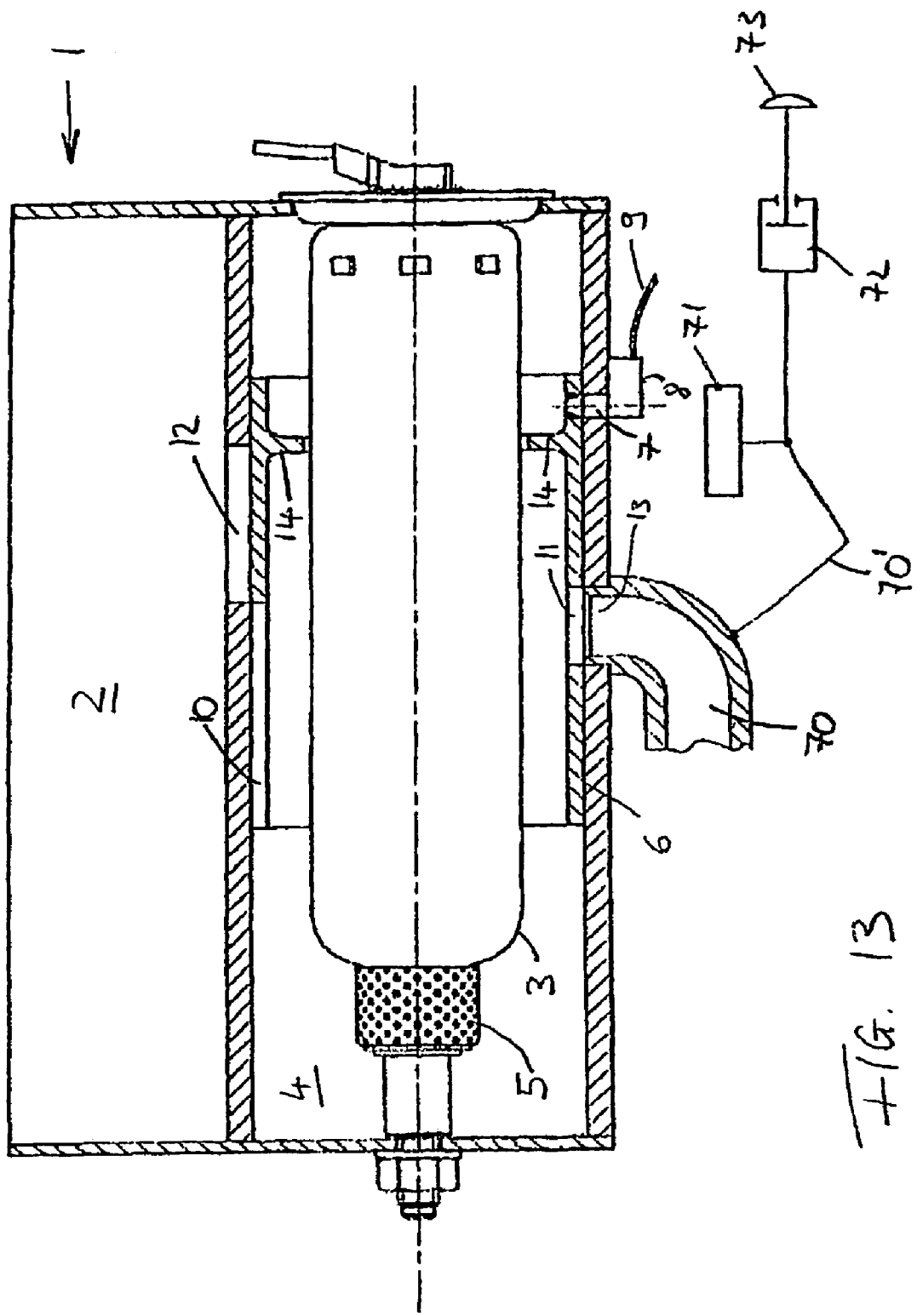
FIG. 13 is a schematic cross section through a variant refinement of the first exemplary embodiment of the invention.

FIG. 13 illustrates one variant refinement of the first exemplary embodiment of the invention. Accordingly, the reference numbers from FIG. 1 are adopted in FIG. 13. In contrast to the variant refinement from FIG. 1, a gas duct 70 is connected to the second outlet opening 13 and via it the gas flowing out of the chamber 4 can be used in order, for example, to inflate a further airbag (for example a knee airbag), to extend a knee cushion, to actuate a cap opening mechanism, etc. This is illustrated schematically in FIG. 13 by the symbols 70' to 73, which illustrate a (knee) airbag module 71 connected to the gas line 70', a piston 72 and a knee cushion 73 which can be actuated by the piston 72. In this variant refinement, the positive gas pressure prevailing in the chamber 4 is therefore used in order to actuate other elements. The second outlet opening 13 is then closed again.

Figure 14:
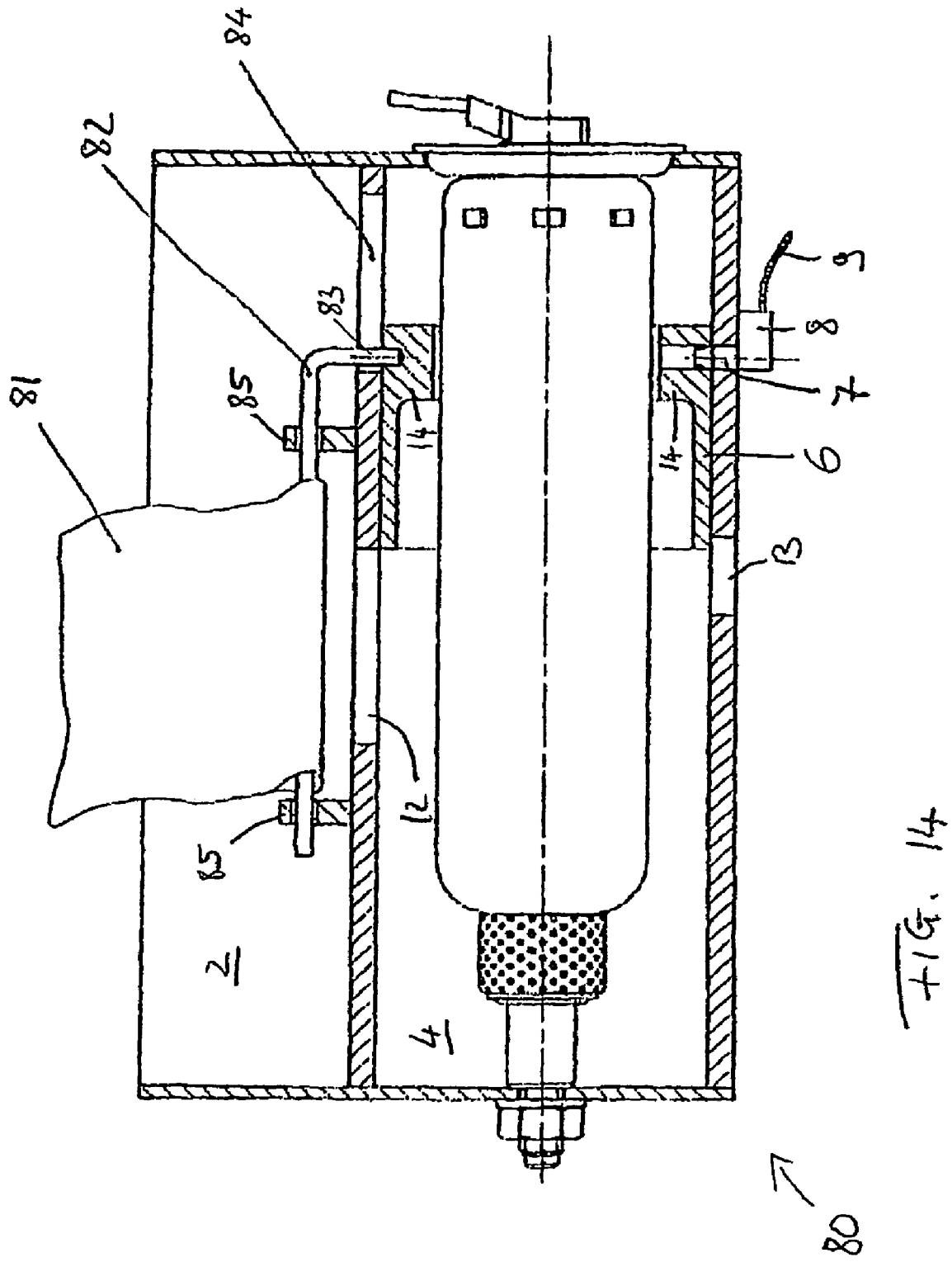
FIG. 14 is a schematic cross section through an airbag arrangement according to a fourth exemplary embodiment of the invention.

FIG. 14 shows, schematically, an airbag arrangement 80 according to a fourth exemplary embodiment of the invention. In this exemplary embodiment, a rebound strap 81 is pulled onto a retaining pin 82 above the first outlet opening 12 in the airbag chamber 2. The retaining pin 82 has an end 83 which is bent at right angles and is secured in the control slide 6. Furthermore, a guide slot 84 is provided in the partition between the airbag chamber 2 and the cylindrical chamber 4 and permits the retaining pin 82 to be displaced parallel to the cylinder axis of the chamber 4. On both sides of the second outlet opening 12, the retaining pin 82 is mounted in a securing device 85 in a manner such that it can likewise be displaced parallel to the cylinder axis of the chamber 4. Between the securing device 85, the rebound strap 81 is pulled onto the retaining pin 82.

The rebound strap 81 initially restricts the expansion of the airbag when it is activated. If the sensors provided in the vehicle determine an OOP situation, then the control slide 6 remains in its inoperative position shown in FIG. 14, and the expansion of the airbag remains restricted. The positive pressure which arises in the chamber 4 can be dissipated via the optional second outlet opening 13.

If an OOP situation is not determined, then the release device 8 brings about an unblocking of the control slide 6 in the manner already described above, so that the projection 14 of said control slide is acted upon by the gas produced by the gas generator 3, and is moved to the right in the orientation of the picture of FIG. 14. As a result, the retaining pin 82 is also moved at the same time. Depending on the dimensioning of the displacement path of the retaining pin 82, its length and the distances between the securing device 85, at least that end which is opposite the angled end 83 of the retaining pin 82 is released from the securing device 85. This enables the retaining strap 81 to slide away from the retaining rod 82, which eliminates the restriction of the expansion of the airbag. The airbag can therefore now be completely deployed, for example in order to provide an extensive support of an "in position" vehicle occupant's head.

This enables optimized occupant kinematics to be realized. That is to say that the deployment of the airbag can be increased as a function of the positioning of the vehicle occupant, and, as a result, the acceleration of the vehicle occupant's body parts (in particular head of an adult, or the entire body of an infant), which are acted upon by the deploying airbag, can be restricted in order to prevent injuries (for example, as a consequence of only the adult's head being accelerated, or backward rolling of an infant caused by the deployment of the airbag).

It should be noted that the invention is not restricted to the exemplary embodiments described, but rather includes modifications within the scope of the area of protection established by the claims. In particular, it is possible to combine the various types of exemplary closing devices and release mechanisms with one another as desired.

What is claimed is:

1. An airbag arrangement, including
   an airbag;
   a gas generator for producing gas to inflate the airbag;
   a housing for accommodating the airbag and/or at least part of the gas generator;
   at least one outlet opening in the housing for letting gas out of the airbag arrangement;
   at least one passage opening in the housing, through which gas produced by the gas generator can pass into the airbag;
   a closing device which can be adjusted between an open position, in which the outlet opening is open and the passage opening is at least partially closed, and
   a closed position, in which the outlet opening is closed and the passage opening is open, and
   a releasable lock which locks the closing device in the open position in the inoperative state, the releasable lock being coupled to a release device which releases the lock when the airbag arrangement is activated in an accident in the absence of an out-of-position (OOP) situation, and the closing device transferring into the closed position.

2. The airbag arrangement of claim 1, wherein the release device is configured to receive a release signal from a sensor for detecting an OOP situation, which sensor produces said signal when the airbag arrangement is activated in the absence of an OOP situation.

3. The airbag arrangement of claim 1, wherein the release device includes a tension strap which, when the airbag is deployed correctly, exerts a tensile force on the releasable lock, which brings about a release of the lock.

4. The airbag arrangement of one of claim 1, wherein the releasable lock is configured to oppose a prestressing force which acts on the closing device and moves the closing device after release from the open position into the closed position.

5. The airbag arrangement of claim 1, wherein the lock includes a deformation element, the deformation of which can be electrically controlled and which is configured to receive a control signal from a control unit which produces said signal when the airbag arrangement is activated in the absence of an OOP situation, and the deformation element, after receiving the control signal, permitting or bringing about a movement of the closing device from the open position into the closed position by being deformed.

6. The airbag arrangement of claim 5, wherein the deformation element includes a bending plate.

7. The airbag arrangement of claim 1, wherein the closing device includes a control slide which can be displaced along a longitudinal axis of the housing between the open position and the closed position and the wall of which has a first cutout which, in the open position, lies over the outlet opening, so that, when the airbag arrangement is activated and there is an OOP situation, gas produced by the gas generator exits from the airbag arrangement via the first cutout and the outlet opening.

8. The airbag arrangement of claim 1, wherein the housing includes an antechamber, for at least partially accommodating the gas generator, and an airbag chamber for accommodating the airbag in the folded-up state, the antechamber and the airbag chamber being connected by the passage opening through which gas produced by the gas generator can pass from the antechamber into the airbag chamber.

9. The airbag arrangement of claim 7, wherein the control slide includes a second cutout which comes to lie over the passage opening in the closed position, so that, when the airbag arrangement is activated and an OOP situation is absent, gas produced by the gas generator enters into the airbag chamber via the second cutout and the passage opening and the airbag is correctly inflated.

10. The airbag arrangement of claim 9, the outlet opening and the passage opening and also the first and second cutouts lying opposite each other in each case.

11. The airbag arrangement of claim 9, the outlet opening and the passage opening and also the first and second cutouts being offset with respect to each other in each case along the axis of displacement of the control slide.

12. The airbag arrangement of claim 7, the control slide including a projection which runs essentially perpendicularly with respect to its displacement direction and forms an application surface for gas produced by the gas generator, as a result of which, when the airbag arrangement is activated, a displacement force in the direction of the closed position is exerted on the control slide.

13. The airbag arrangement of claim 7, the antechamber being essentially cylindrical, and the control slide being formed by a cylindrical piston which is guided in a sliding manner through the antechamber along its longitudinal axis.

14. The airbag arrangement of claim 12, the projection being annular and pointing into the interior of the piston.

15. The airbag arrangement of claim 7, the control slide being coupled to a deformation element which becomes deformed during displacement of the control slide in order thereby to control the displacement speed and/or the displacement acceleration of the control slide.

16. The airbag arrangement of claim 7, the releasable lock being formed by a pin which runs through the outer walls of the antechamber and the control slide and fixes the control slide relative to the antechamber in the open position.

17. An airbag module comprising:
   an airbag, a gas generator and a housing containing the airbag, the housing including an outlet for letting gas out of the airbag arrangement and an inlet for allowing gas from the gas generator into the housing;
   a closing device having an open position in which the outlet is open and the inlet is at least partially closed, and a closed position, in which the outlet opening is closed; and
   a releasable lock configured to lock the closing device in the open position.

* * * * *